United States Patent [19]

Poulos

[11] Patent Number: 5,123,574

[45] Date of Patent: Jun. 23, 1992

[54] DISPENSING LID OR CAP

[76] Inventor: James F. Poulos, 4025 Easley Rd., Golden, Colo. 80403

[21] Appl. No.: 745,547

[22] Filed: Aug. 15, 1991

[51] Int. Cl.⁵ ............................................. G01F 11/10
[52] U.S. Cl. ................................. 222/362; 222/480; 222/541; 222/575; 221/252; 221/264; 215/253; 251/206
[58] Field of Search ............... 222/370, 480, 541, 565, 222/575, 362; 251/206; 137/797; 221/252, 264, 265, 302; 206/532; 215/253

[56] References Cited

U.S. PATENT DOCUMENTS

| 934,932 | 9/1909 | Osbourn | 251/206 |
|---|---|---|---|
| 1,664,223 | 12/1953 | Dobkin | 221/265 |
| 2,630,245 | 3/1953 | Maier | 221/265 |
| 2,944,707 | 7/1960 | Steinmetz | 222/370 X |
| 3,007,612 | 11/1961 | Tepper | 222/362 X |
| 3,126,125 | 3/1964 | Eggers | 222/480 X |
| 3,249,266 | 5/1966 | Cole | 222/370 X |
| 3,470,893 | 10/1969 | Nelson | 137/602 X |
| 3,860,111 | 1/1975 | Thompson | 206/534 |
| 3,885,703 | 5/1975 | Neavin | 221/202 |
| 3,889,847 | 6/1975 | Uroschevich | 221/265 |
| 3,921,851 | 11/1975 | Nilson | 221/151 |
| 3,991,908 | 11/1976 | Thomas et al. | 221/154 |
| 4,032,050 | 6/1977 | Funk | 222/362 X |
| 4,141,461 | 2/1979 | LaChance | 220/253 |
| 4,150,766 | 4/1979 | Westendorf et al. | 221/265 X |
| 4,322,017 | 3/1982 | Lowdermilk | 222/362 X |
| 4,523,694 | 6/1985 | Veltri | 221/265 |
| 4,526,293 | 7/1985 | Kramer | 221/298 |
| 4,611,727 | 9/1986 | Graff | 221/154 |
| 4,613,057 | 9/1986 | Sacchetti et al. | 221/265 |
| 4,756,434 | 7/1988 | Frank | 215/201 |
| 4,832,235 | 5/1989 | Palmer | 222/370 |

Primary Examiner—Gregory L. Huson
Attorney, Agent, or Firm—H. Kenneth Johnston, II

[57] ABSTRACT

A dispenser having a base with a multiple of different sized perforated configurations which may be punched out and a groove for receiving a retaining tongue and a dispensing disk having an opening large enough to accommodate the largest perforation punch out. There is a cap having a slot for receiving the lever portion of the dispensing disk and a tongue for communication with the groove of the base, retaining the cap securely onto the base so that when the lever is moved back and forth a single unit is dispensed.

1 Claim, 2 Drawing Sheets

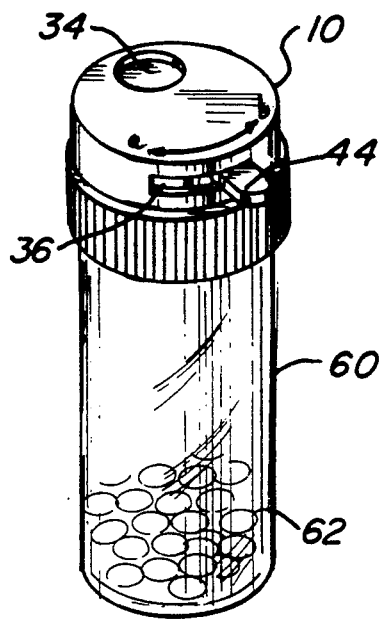
Fig_1
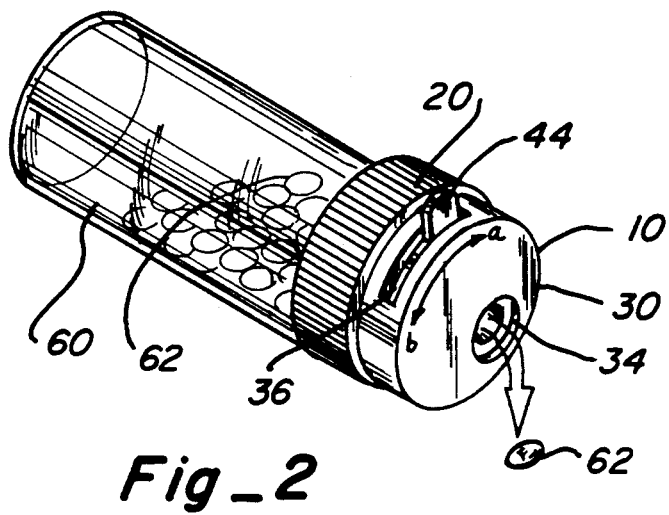
Fig_2
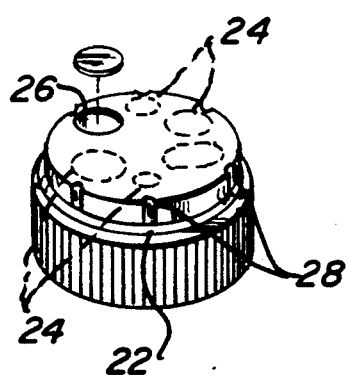
Fig_4
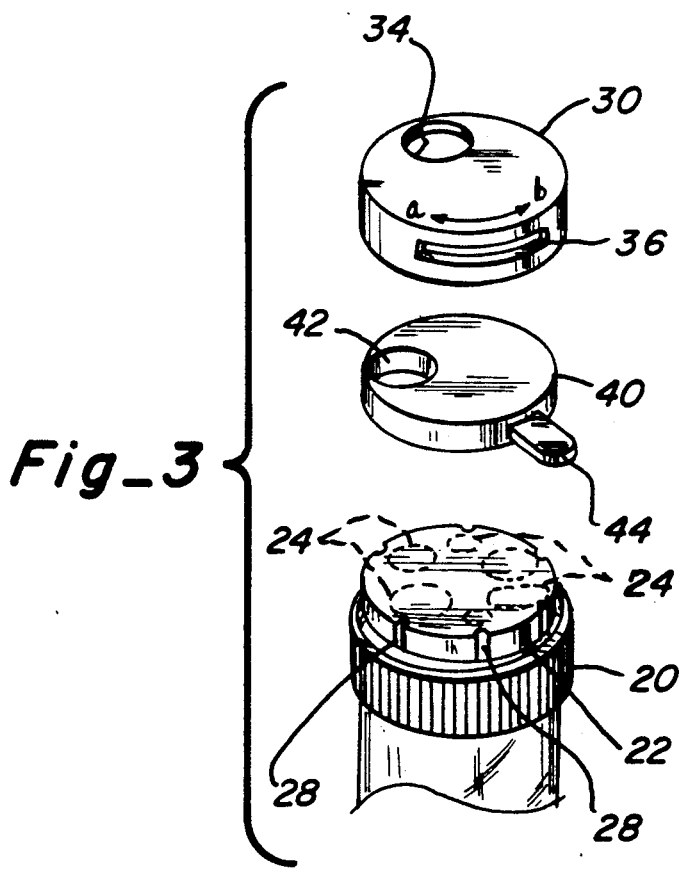
Fig_3

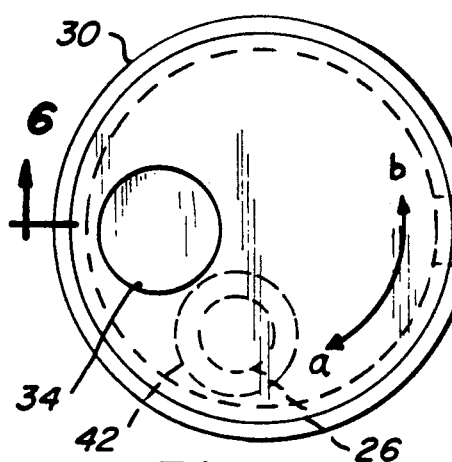
Fig_5
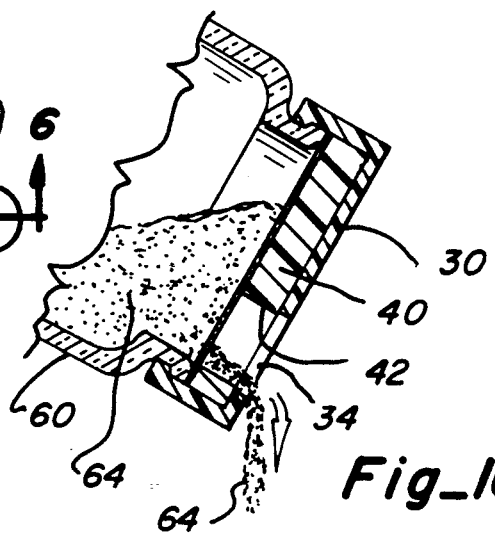
Fig_10
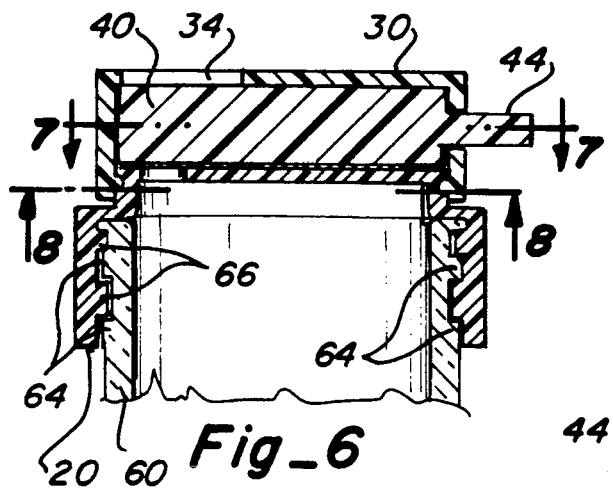
Fig_6
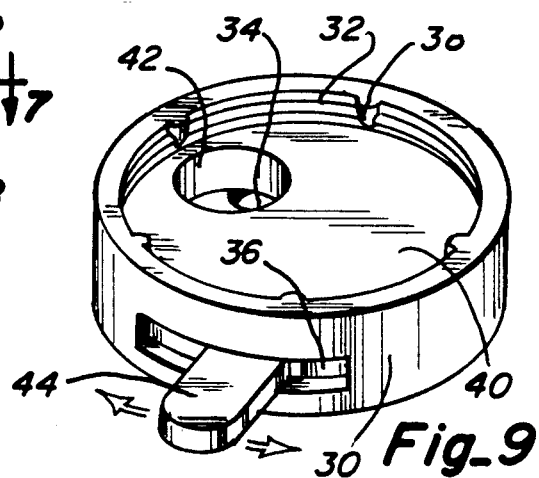
Fig_9
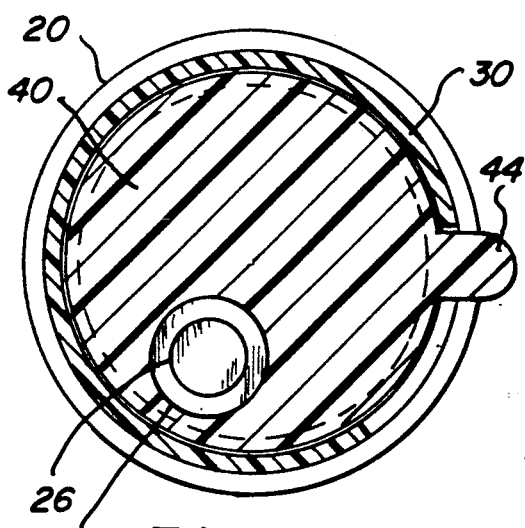
Fig_7
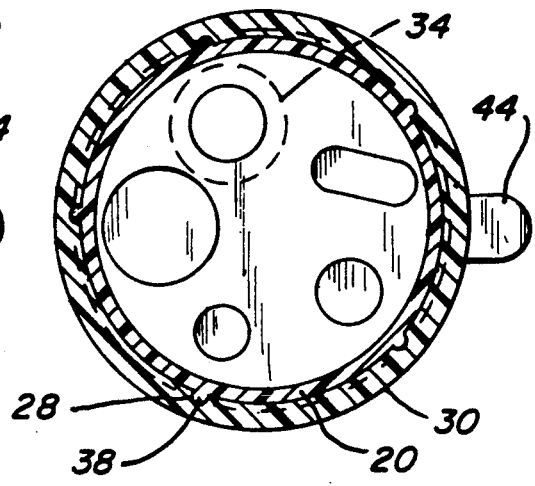
Fig_8

DISPENSING LID OR CAP

BACKGROUND OF THE INVENTION

There have been numerous types of pill dispensing closures. Most of which have been designed to deter small children from gaining access to potentially harmful products. Because of their designs a great many of these closures are difficult and frustrating to the elderly. In many cases when the person gets the lid off the child proof container, they are left off and are then easily knocked over or just because of the lack of individual's dexterity, a large number of pills are dumped out. There are no devices which allow the dispensing of a single pill of any size without complicated determinations of opening size. Maier, U.S. Pat. No. 2,630,245 discloses a capsule dispensing device which utilizes the capsules as roller bearings, however is limited to dispensing of capsules and requires a few capsules in the mechanism to work properly. Dobkin, U.S. Pat. No. 2,664,223 discloses a pellet dispenser which is designed so that contact with the dispensed product is avoided. Thompson, U.S. Pat. No. 3,860,111 discloses a pill container and dispenser having multiple rotatable disks requiring the individual to move each dish to a designated number on the container to set the dispenser to dispense the proper size and number of pills. If the disks are inadvertently moved, too many pills may be dispensed or none at all. Either of which is frustrating to the individual trying to get the proper dosage. Uroschevich, U.S. Pat. No. 3,889,847 discloses a child resistent pill dispenser, however, it requires an individual with a reasonable amount of dexterity to operate. Neavin, U.S. Pat. No. 3,885,703 discloses a device which necessitates movement of a handle by a 180° and agitating the pills at the same time. The device is not useful for dispensing any pills except those of uniform size. Kramer, U.S. Pat. No. 4,526,293 has similar disadvantages as the other child proof dispensing devices already discussed. Frank, U.S. Pat. No. 4,756,434 has similar limitations as Kramer above. Other such as Graff, U.S. Pat. No. 4,611,727 and Sacchetti, U.S. Pat No. 4,613,057 are complicated and do not provide the ease of use and simplicity of the within invention.

Nilson, U.S. Pat. No. 3,921,851, Thomas, U.S. Pat. No. 3,991,908 and Veltri, U.S. Pat. No. 4,523,694 are complex dispensing devices and no not allow the dispensing of a choice of sized product. The devices are also difficult for the elderly to use.

LaChance, U.S. Pat. No. 4,141,461 is difficult for the elderly to use as it requires the individual to lift and disengage the lock mechanism before a pill can be dispensed.

Spices and the like loose a substantial amount of their aromatics when they are exposed to the air. Most of the spice dispensers require that the lid be removed to dispense the spice allowing the spice to be continually exposed to the air with each use. The present invention eliminates this problem as once the lid is installed, the dispensing of each portion permits only a negligible amount of air to contact the spice as it is dispensed. The dispenser provides the same portion each time without the difficulty of measuring, although many of the elderly enjoy cooking because of the lack of dexterity they have difficulty measuring small quantities of spices without spilling them. The within dispenser eliminates this problem by measuring out the same quantity of spice each time.

The within invention provides a dispenser for spices which eliminates the necessity of removal of the lid and exposure to the air.

OBJECTS OF THE INVENTION

It is the general object of this invention to provide a dispenser which can be readily assembled by the user which dispenses a single dose for each forward and backward movement of the lever.

It is another object of this invention to provide a spill proof re-usable dispenser.

It is further a object of this invention to overcome the disadvantages of the tamper resistent and complex dispensing devices of the prior art which the elderly find extremely difficult and frustrating to use.

It is still a further object of this invention to provide a simple dispenser of pills, capsules and other products one unit at a time.

It is still another object of this invention to provide a dispenser for spices which keeps the spices fresh and dispenses a single portion without the removal of the lid and exposure to the air.

BRIEF DESCRIPTION OF THE DRAWINGS

FIG. 1 is a perspective view of the dispenser embodying the invention.

FIG. 2 is a perspective view of the dispenser embodying the invention dispensing a single unit.

FIG. 3 is an exploded view of the various parts in their relative position before assembly.

FIG. 4 is a perspective view of the base having a dispensing opening removed.

FIG. 5 is a top view of the dispenser.

FIG. 6 is a cross sectional view of the dispenser taken along the lines 6—6 of FIG. 5.

FIG. 7 is a cross sectional top view taken along the lines 7—7 of FIG. 6.

FIG. 8 is a cross sectional bottom view of the dispenser taken along the lines 8—8 of FIG. 6.

FIG. 9 is a bottom perspective view of the cap and dispensing disk.

FIG. 10 is a perspective view of the dispenser embodying the invention dispensing spices.

DETAILED DESCRIPTIONS OF THE INVENTION

Referring now to the drawings, a dispenser 10 includes a cap 30, base 20 and dispensing disk 40 as shown in FIG. 3. Cap 30 has a dispensing opening 34 allowing pills or other materials to be dispensed to the user and a slot 36 adapted to receive lever 44 of dispensing disk 40 as shown in FIGS. 1, 2, 3, and 9. Cap 30 has a tongue 32 designed to mate with groove 22 of base 20 as shown in FIGS. 3 and 9. Base 20 has perforations 24 which allow a certain size opening to be selected depending on the size of unit to be dispensed as shown in FIGS. 3, 4, and 8. Dispensing disk 40 has opening 42 which is offset toward the outer edge of said dispensing disk 40 in a manner that allows opening 42 to move in an arc to receive a unit through the opening generated by removal of material perforation 24 when lever 44 is in position "A" as shown in FIG. 5. When lever 44 is moved to position "B" a unit is to allowed to be dispensed through opening 42 as shown in FIG. 2. Dispensing disk 40 has opening 42 and lever 44 as shown in FIG. 3. Base 20 has a locator groove 28 designed to accept locator tongue 38 of cap 30 securing cap 30 in place so that dispensing disk 40 will align over opening 26 when lever 44 is in position "B" and allows a unit to be dispensed when lever 44 is moved to position "B" as shown in FIGS. 2, 5, 8, and 9.

In use, dispenser 10 is obtained in the disassembled condition as shown in FIG. 3. The individual then selects the size of unit that is desired to be dispensed and punches out that perforation 26 as shown in FIG. 4. Lever 44 is then inserted through slot 36 of cap 30 in a manner that lever 44 extends outside of cap 30 and this assembly is put on to base 20 utilizing the locator tongue and locator grooves 38 and 28 respectively. This is done by looking from the bottom of base 20 through the punched out opening 26 and holding the lever 44 in position 6. Tongue 32 and groove 22 hold cap 30 on base 20 and locator tongue 38 and locator groove 28 retain cap 30 in place to properly accept product to be dispensed. Dispenser 10 is then screwed onto a container 60 and held in place by base threads 66 and container threads 64 as shown in FIG. 6. Dispenser 10 dispenses a single product, one at a time when the container is tipped on its side or upside down depending on how full container 60 is and moving lever 44 from position "B" to position "A", as shown in FIG. 2. Although opening 42 is shown opposed to lever 44 of dispensing disk 40, opening 42 may be placed any place off set from the center of said dispensing disk 40 that allows the opening 42 to align with opening 26 when lever 44 is in position "B" and to align with opening 42 when lever 44 is in position "A".

FIG. 7 shows the opening 42 aligned over perforation 26 which allows the product to be received by opening 42 in the inverted position. Powdered product 64 such as spices may be dispensed from dispenser 10 as shown in FIG 10.

While the present invention has been described and illustrated with its preferred embodiments, and with relation to specific problems encountered by the elderly in the dispensing of products from vitamins to spices, it is to be understood that the invention is not limited thereto. Applicant can foresee, and indeed would expect those skilled in the art and equipped with the present invention to devise various modifications, alterations or substitutions for the specific structural features of the devices as described and illustrated. As such, it is the applicants intent to cover any and all such modifications, alterations, etc. falling within the spirit and scope of the invention, as expressed by the claims appended hereto in accordance with the laws of this country.

What is claimed:

1. An easy to use and assemble dispenser for attaching to a container comprising:

a base;

said base capable of being affixed to a container at a lower portion of said base; said base having an upper portion of said base having a continuous circular wall extending vertically from said lower portion and having a perpendicular portion in continuous contact with said continuous circular wall; said perpendicular portion having a series of perforation means at least one of which is selectively removed providing an opening through which a product may be dispensed;

said continuous circular wall of said base having a vertical locator groove means and a continuous horizontal groove;

a cap;

said cap having a top portion and a continuous circular wall portion; said continuous circular wall portion extending downwardly from the outer most portion of said top portion;

said continuous circular wall portion having a slot for accepting a lever there through;

said top portion of said cap having a opening through which a product may be dispensed;

said continuous circular wall portion having a continuous horizontal tongue and having a vertical locator tongue means;

a dispensing disk;

said dispensing disk having a lever means extending from said disk;

a opening through said dispensing disk approximately opposite said lever means and at a center most portion of said dispensing disk;

Whereby when said dispensing disk is inserted within said cap, said cap is affixed to said base by said horizontal tongue of said cap communicating with said horizontal groove of said base and is properly positioned over said opening of said base by said vertical locator tongue means of said cap communicating with said vertical locator groove means of said base allowing a product to be dispensed by the movement of said lever backward and forward within said slot of said cap.

* * * * *